US012318933B2

(12) United States Patent
Wales et al.

(10) Patent No.: US 12,318,933 B2
(45) Date of Patent: Jun. 3, 2025

(54) SYSTEM FOR PRESENTING ROBOTIC DATA FLOWS FOR APPLICATION DEVELOPMENT

(71) Applicant: SANCTUARY COGNITIVE SYSTEMS CORPORATION, Vancouver (CA)

(72) Inventors: Carolyn Wales, Campbell, CA (US); Chris Cianci, Campbell, CA (US); Jeff Kranski, Campbell, CA (US); Adrian Kaehler, Campbell, CA (US)

(73) Assignee: Sanctuary Cognitive Systems Corporation, Vancouver (CA)

(*) Notice: Subject to any disclaimer, the term of this patent is extended or adjusted under 35 U.S.C. 154(b) by 362 days.

(21) Appl. No.: 17/711,973

(22) Filed: Apr. 1, 2022

(65) Prior Publication Data
US 2022/0314435 A1 Oct. 6, 2022

Related U.S. Application Data

(60) Provisional application No. 63/169,721, filed on Apr. 1, 2021.

(51) Int. Cl.
B25J 9/16 (2006.01)
B25J 9/02 (2006.01)
B25J 19/02 (2006.01)
G06T 19/00 (2011.01)

(52) U.S. Cl.
CPC .............. B25J 9/163 (2013.01); B25J 9/161 (2013.01); B25J 9/1664 (2013.01); B25J 9/1682 (2013.01); B25J 9/1689 (2013.01); B25J 9/1697 (2013.01); B25J 19/02 (2013.01); G06T 19/006 (2013.01)

(58) Field of Classification Search
CPC . B25J 9/163; B25J 9/161; B25J 9/1664; B25J 9/1682; B25J 9/1689; B25J 9/1697; B25J 19/02; B25J 9/1602; G06T 19/006
See application file for complete search history.

(56) References Cited

U.S. PATENT DOCUMENTS

| 10,192,195 | B1 | * | 1/2019 | Brazeau | B25J 9/1661 |
| 11,822,308 | B2 | * | 11/2023 | Zhang | G05B 19/404 |
| 2018/0111765 | A1 | * | 4/2018 | Wicks | B65G 59/02 |
| 2018/0200888 | A1 | * | 7/2018 | Kim | G05D 1/0246 |
| 2018/0338806 | A1 | * | 11/2018 | Grubbs | A61B 34/30 |

(Continued)

FOREIGN PATENT DOCUMENTS

KR 10-1478257 B1 12/2014

OTHER PUBLICATIONS

Internet Archive of "Transfer Learning," Wikipedia, https://web.archive.org/web/20210331015532/https://en.wikipedia.org/wiki/Transfer_learning, Mar. 31, 2021, pp. 1-5.

(Continued)

Primary Examiner — Sohana Tanju Khayer
(74) Attorney, Agent, or Firm — Thomas Mahon; Adenike Adebiyi

(57) ABSTRACT

A robot system includes a first computing device and a second computing device. The first computing device is configured to control operation of the robot based on data flows received from a plurality of sensors of the robot and the second computing system is configured to receive and process at least some of the data flows concurrently while the first computing system controls operation of the robot.

20 Claims, 7 Drawing Sheets

(56) References Cited

U.S. PATENT DOCUMENTS

| | | | |
|---|---|---|---|
| 2019/0091860 A1* | 3/2019 | Lipay | G06Q 10/0633 |
| 2019/0152054 A1* | 5/2019 | Ishikawa | B25J 9/163 |
| 2019/0240842 A1* | 8/2019 | Hsu | H04W 4/80 |
| 2020/0090022 A1* | 3/2020 | Ma | G06N 3/08 |
| 2020/0189100 A1* | 6/2020 | Rácz | G05B 19/4103 |
| 2020/0201352 A1* | 6/2020 | Wang | G05D 1/0274 |
| 2020/0233436 A1* | 7/2020 | Fox | G05D 1/0289 |
| 2021/0081752 A1 | 3/2021 | Chao et al. | |
| 2021/0252698 A1 | 8/2021 | Paxton et al. | |
| 2021/0253128 A1 | 8/2021 | Nister et al. | |
| 2021/0357782 A1 | 11/2021 | Graves et al. | |
| 2021/0379758 A1* | 12/2021 | Chu | B25J 9/1661 |
| 2021/0387330 A1 | 12/2021 | Mavrin et al. | |
| 2022/0016766 A1 | 1/2022 | Humayun et al. | |
| 2022/0035973 A1 | 2/2022 | Liebman et al. | |
| 2022/0051138 A1 | 2/2022 | Stoll et al. | |
| 2022/0084272 A1 | 3/2022 | Wang et al. | |
| 2022/0101627 A1 | 3/2022 | Pappas et al. | |
| 2022/0355469 A1* | 11/2022 | Song | A61F 2/68 |

OTHER PUBLICATIONS

International search report, PCT/US2022/023167, mailed Jul. 18, 2022.
Written Opinion of the International Searching Authority, PCT/US2022/023167, mailed Jul. 18, 2022.

* cited by examiner

SYSTEM FOR PRESENTING ROBOTIC DATA FLOWS FOR APPLICATION DEVELOPMENT

CROSS-REFERENCE TO RELATED APPLICATIONS

This patent claims the benefit of U.S. Provisional Patent Application 63/169,721 filed 1 Apr. 2021, titled "System for Presenting Selected Robotic Data Flows as a Platform for Application Development." The entire content of each aforementioned patent filing is hereby incorporated by reference.

BACKGROUND

The present disclosure relates to robotics and, more specifically, to system for presenting selected robotic data flows as a platform for application development.

Dynamic mechanical systems are often controlled with computational processes. Examples include robots, industrial processes, life support systems, and medical devices. Such a process takes input from sensors indicative of state of the dynamic mechanical system and its environment and determines outputs that serve to control various types of actuators within the dynamic mechanical system, thereby changing the state of the system and potentially its environment.

SUMMARY

The following is a non-exhaustive listing of some aspects of the present techniques. These and other aspects are described in the following disclosure.

Some aspects include a system for preparing robotic data flows for application development that includes: a robot having a first computing system configured to control operation of the robot based on data flows received from a plurality of sensors of the robot, the first computing system being onboard the robot and having a first network interface, the first computing system exposing an application program interface (API) by which at least some of the data flows are consumable by other computing devices; and a second computing system having a second network interface and configured to both receive, via the API and the second network interface, and process at least some of the data flows concurrently while the first computing system controls operation of the robot.

Some aspects include a tangible non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE SEVERAL VIEWS OF THE DRAWINGS

The above-mentioned aspects and other aspects of the present techniques will be better understood when the present application is read in view of the following figures in which like numbers indicate similar or identical elements.

Figure 1:
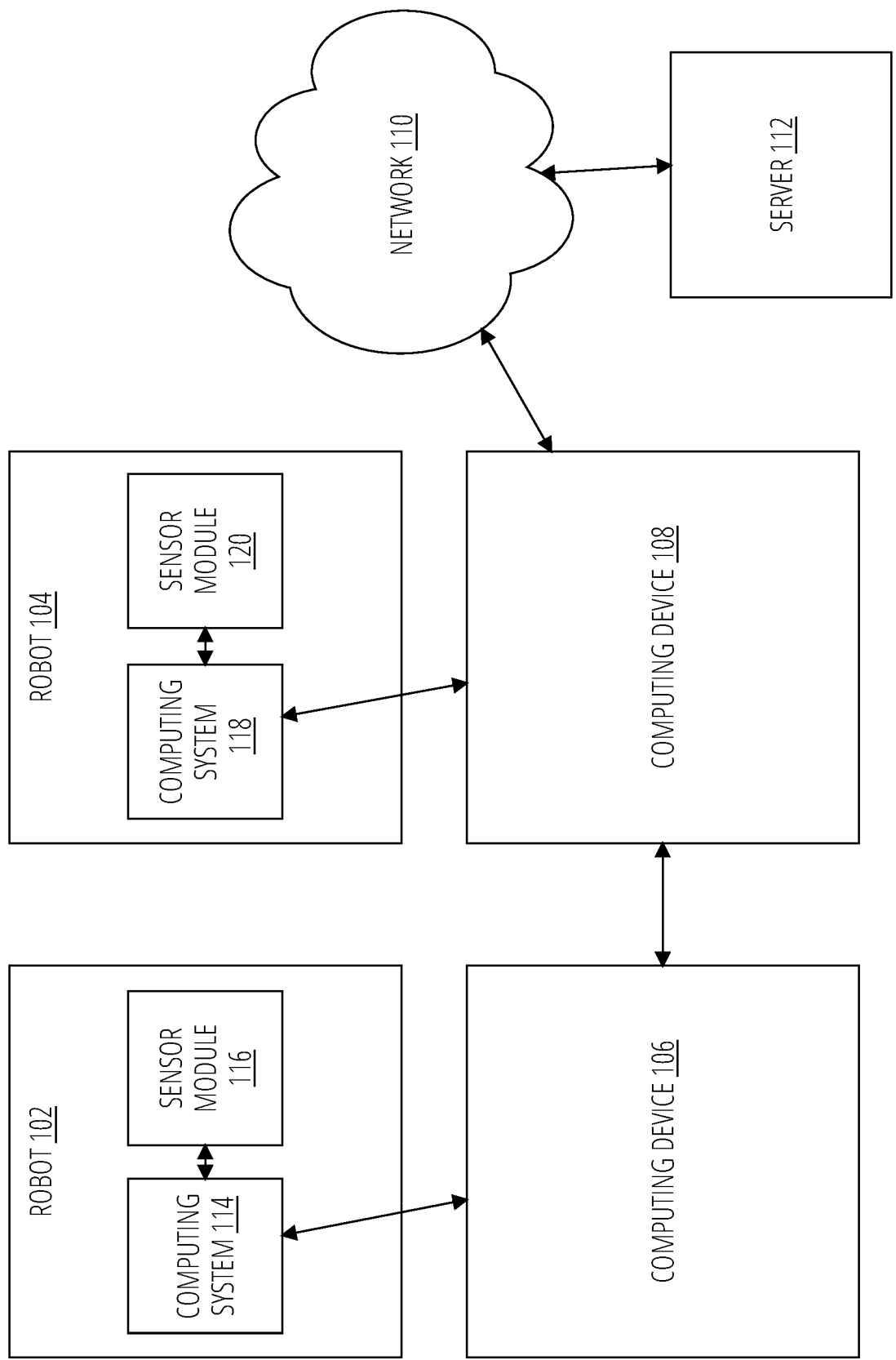
FIG. 1 illustrates an example robotic system for presenting robotic data flows for application development in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

To mitigate the problems described herein, the inventors had to both invent solutions and, in some cases just as importantly, recognize problems overlooked (or not yet foreseen) by others in the fields of artificial intelligence and robotics. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Often, sensor suites for controlling dynamic mechanical systems generate data that has uses beyond controlling the system, but that data often goes unused for other purposes. Often, this is because the systems are designed with a focus on real-time, on-board control, with low latency and bespoke system busses or networks that are not interoperable with external computing devices or networks, particularly when the other external computing devices are concurrently performing real-time operations on the sensor data. (Discussion of these challenges and others herein should not be read as a disclaimer of any subject matter.)

Some embodiments include a robotic system (or other dynamic mechanical system) that generates a variety of data flows from sensors used to control that system, including cameras, depth images (which may be acquired by depth cameras), servo data packets, touch information (like from tactile sensors), mode change notifications, and policy outputs (e.g., from a deep neural network reinforcement learning model used to control the dynamic mechanical system). In some embodiments, the data flows from sensors including more information than necessary for operating the robot.

The unused sensor data that is collected and stored in memory may go unused by the control routines.

Rather than keeping the data flows stagnant in storage or discarding, in some embodiments, the data flows may be transmitted for consumption by reinforcement learning policies to generate actions. The data flows are expected to have great utility in the provision of auxiliary applications, including performance dashboards, task-specific image processing, statistical process control, manufacturing traceability, systems integration and general interfaces with external software, hardware, and firmware. To this end or others, some embodiments implement a system architecture where the primary observation, policy computations, and commands are executed on a single dedicated computer (or cluster of co-located, onboard computers), while some or all relevant data streams (e.g., the above-noted data flows) are made available via a standardized application-program interface (API) carried over a fixed-latency (or variable-latency) medium, such as a high-bandwidth Ethernet connection, to a second dedicated (or multipurpose) computing device (or collection thereof). In some embodiments, the connection is one with a quick-connect (e.g., supporting hot swapping) capabilities, such as a microblade family of servers. In some embodiments, offline processing on the second computing device would not interfere with real-time (e.g., producing outputs within less than 500 ms, less than 50 ms, or less than 10 ms of receiving inputs) control capabilities of the dynamic mechanical system in operation but would provide external developers an interface to make use of the outbound data flows. Some embodiments may allow an inbound command connection as well, such that external applications may have control over, for example, which mode the robot was operating in or what tasks it was attempting to perform. One example application of this system is to take the robot's camera stream and use it to perform barcode scanning for lot traceability.

In some cases, the second, or auxiliary computing device (or cluster thereof) may be co-located relative to a robot, e.g., in the same facility or same room, connected via a local area network, like via a full-duplex Ethernet connection in a point-to-point topology, an InfiniBand connection, a Fibre Channel connection, or the like. In some cases, the auxiliary computing device may include a server configured to output dashboards or other user-facing interfaces to be displayed on other computing devices, like remote computing devices executing a web browser in which the UI is displayed. In some cases, the auxiliary computing device includes a monitor or other display (like a head-mounted augmented reality display) in which the UI is displayed. For instance, some embodiments may implement an augmented reality display operative to guide a user manually operating a robot, displaying, for instance, singularity points to be avoided for path planning purposes, optimal paths from a current state to an expected target state, predicted next movements based on a current state of a partially or fully trained model, instructions on a next step in a process, or the like. In some embodiments, the auxiliary computing device may expose an API by which sensor data is consumed by other computational processes.

In some cases, the secondary computing device may be a cluster of computing devices that collectively execute a distributed real-time, complex event processing framework, like Apache Spark™, Apache Storm™, Apache Flink™, Microsoft StremInsight™, Oracle Event Processing™, or the like, to process relatively high-bandwidth data flows. The term "complex" in "complex event processing" is not a term of degree that specifies greater than some threshold amount of complexity. Rather, it is part of a term of art by which a certain class of process architectures for processing real-time events and extracting information from event streams as they arrive. Some embodiments may implement, for example, routines to detect model suitability (e.g., by measuring failure rates or amounts of operation within some threshold of tolerances), comparisons of planned versus executed paths (e.g., a maximum deviation, a root mean square of deviation, or the like), noise in robot movements, and the like. In some cases, active learning, preventative maintenance, or model retraining may be triggered responsive to detecting an excess of such phenomena (e.g., more than threshold amount). In some cases, code of the model controlling the robot may be instrumented, and metrology may be ingested by the auxiliary computing device via the above-described API to facilitate diagnostic of a robot's code. These techniques may be implemented with a computer process, which may be implemented as a single process (in the operating system sense of the word) on a single computer or a collection of processes (in the operating system sense of the word) executing a collection of computers, notwithstanding use of the singular term "process."

In some cases, the auxiliary computing device may have similar connections to a plurality of robots or other dynamical systems that operate in concert in overlapping workspaces, and the auxiliary computing device may issue commands via the APIs to coordinate their operation. For instance, one robot may be directed to place an object in a specified place where another robot will pick up the object, or two robots may apply torque in opposite directions to different parts of a workpiece to thread one component onto another.

In some embodiments, the auxiliary computing device is connected to the primary computing device controlling the robot via a physical media over which a relatively high-performance, low-latency, high-bandwidth communication protocol is implemented. Examples include 400 Gb or 800 Gb or faster Ethernet, InfiniBand with 4× or 12× or higher port widths, Omni-Path, and Fiber channel. In some cases, connections may be implemented via hot-pluggable connectors, like quad small form-factor connectors, like QSFP+ or QSFP28 connectors). In some cases, latency may be further reduced with techniques like remote direct memory access, from the auxiliary system, into system memory of the primary computing device controlling the robot to access sensor data without materially adding to the compute overhead of the primary computing system, for instance, via remote direct memory access over converged Ethernet (RoCE) v1 or v2. Or in some cases, packets of sensor data (e.g., on a controller area network (CAN) bus) may be captured and sent directly to the secondary computing device without passing through the primary computing device (e.g., with a NIC in store-and-forward mode positioned in series on a CAN bus between the sensors and the primary computing device and connected to a NIC on the secondary computing device).

In some cases, the primary computing device (e.g., one on-board a robot) may concurrently control a robot like that described in U.S. patent application Ser. No. 16/918,999, filed 1 Jul. 2020, titled Artificial Intelligence-Actuated Robot, the contents of which are hereby incorporated by reference. Other types of robotics may also be controlled with the present techniques, which are expected to be particularly beneficial in unstructured and semi-structured environments, like those encountered by drones and self-driving vehicles.

In some embodiments, such auxiliary computing devices may be tiered, with lower-tier devices being coupled through higher-bandwidth, lower latency connections to robotic sensors than higher tier auxiliary devices. In some cases, lower-tier devices may filter or compress sensor data before the filtered or compressed sensor data is advanced to higher tier auxiliary devices, which in some cases, may consolidate such data from a plurality of robots, like more than 5, more than 20, more than 100, or more than 1,000. Examples of filtering may include defensive sampling of sensor data before advancing that data to higher-tier auxiliary computing devices, e.g., in accordance with such sampling techniques like those described in Hesterberg, T., 1995, "Weighted average importance sampling and defensive mixture distributions," Technometrics, 37(2):185-194, the contents of which are hereby incorporated by reference. Other examples include compression by transforming time-slices of sensor data into vectors in a latent embedding space with an encoder or by various other forms of lossy or lossless compression.

FIG. 1 illustrates an example robotic system 100 for preparing robotic data flows for application development in accordance with some embodiments. Robotic system 100 includes one or more robots including robot 102, and robot 104. Each robot may include an onboard computing system 114, 118 and one or more sensor modules 116, 120. Robot 102 may be communicably coupled to computing device 106 and robot 104 may be communicably coupled to computing device 106 and/or computing device 108. Each robot may be in communication with one or more external computing devices. The computing devices may communicate to one or more server 112 via network 110. In some embodiments, computing device 106 and/or computing device 108 are embedded onboard robot 102 and 104 as a secondary computing device.

Robot 102 is configured to receive sensor data from onboard sensors via sensor module 116. This data flow from sensor module 116 is sent to computing system 114 for processing. Computing system may also transmit one or more portions of the data flow to an external computing device (e.g., computing device 106) or to a remote server (e.g., server 112) via network 110.

In some embodiments, the data flow from sensor module 116 or 120 may be transmitted to server 112, processed, and returned back to respective robot 102 and/or 104. Based on the received processed data flow, the robots 102, 104 may be controlled accordingly.

Figure 2:
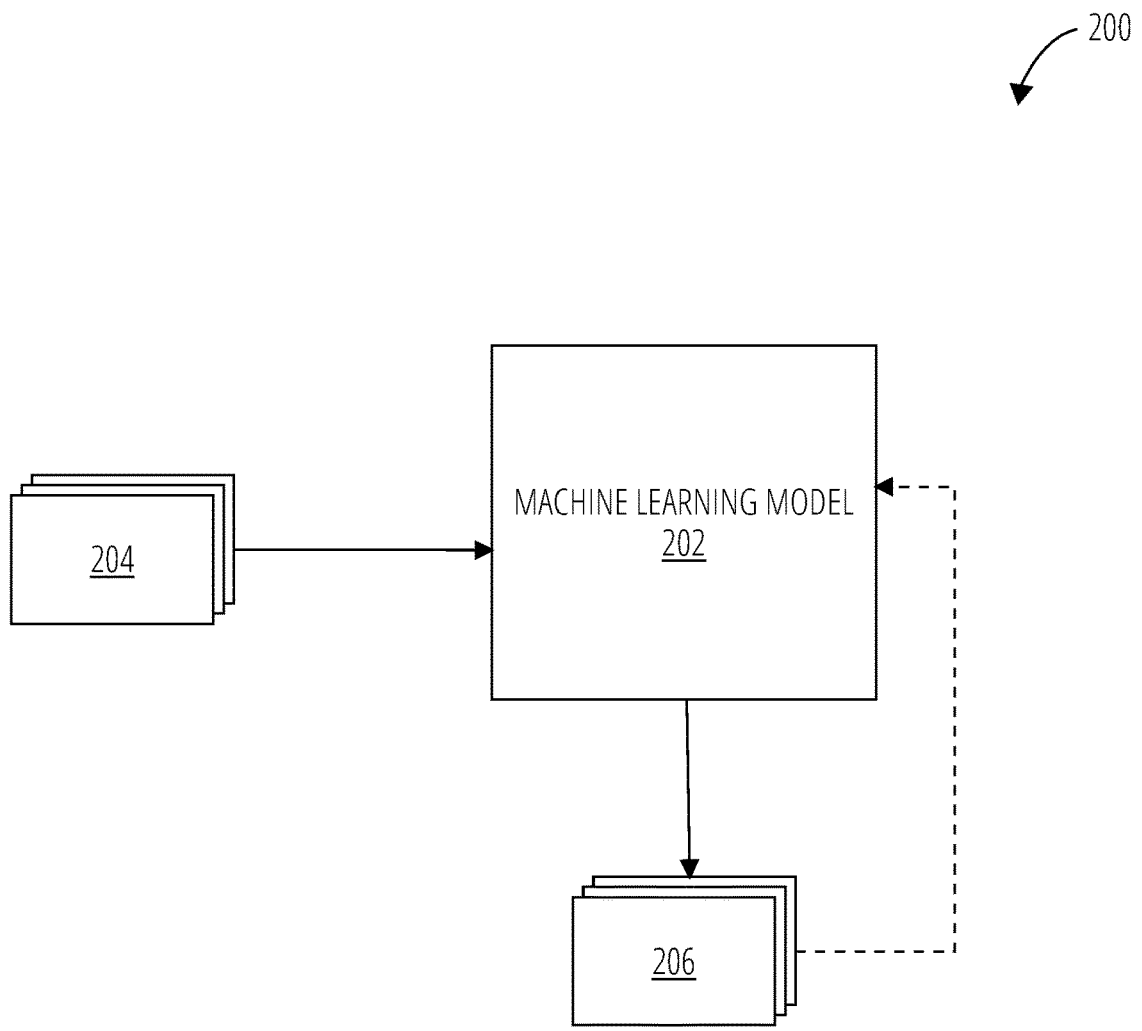
FIG. 2 illustrates an example machine learning model in accordance with some embodiments.

FIG. 2 illustrates an example machine learning machine learning system 200. Machine learning model 202 may take inputs 204 and provide outputs 206. In one use case, outputs 206 and resulting sensor data indictive of consequences may be logged to train machine learning model (202) (e.g., alone or in conjunction with user indications of the accuracy of outputs 206, labels associated with the inputs 204, or with other reference feedback and/or performance metric information). In another use case, machine learning model 202 may update its configurations (e.g., weights, biases, or other parameters) based on its assessment of its prediction (e.g., outputs) and reference feedback information (e.g., user indication of accuracy, reference labels, or other information). In some embodiments, machine learning model 202 is a neural network and connection weights and biases (or other model parameters) may be adjusted to reconcile differences between the neural network's prediction and the reference feedback. In some embodiments, one or more neurons (or nodes) of the neural network may have their respective errors sent backwards through the neural network to facilitate the update process (e.g., backpropagation of error). Updates to the connection weights may, for example, be reflective of the magnitude of error propagated backward after a forward pass has been completed. In this way, for example, the machine learning model 202 may be trained to generate results (e.g., response time predictions, sentiment identifier, urgency levels) with better recall, accuracy, and/or precision.

In some embodiments, the machine learning model 202 may include an artificial neural network. In such embodiments, machine learning model 202 may include an input layer and one or more hidden layers. Each neural unit of the machine learning model may be connected with one or more other neural units of the machine learning model 202. Such connections can be enforcing or inhibitory in their effect on the activation state of connected neural units. Each individual neural unit may have a summation function which combines the values of one or more of its inputs together. Each connection (or the perceptron itself) may have a threshold function that a signal must surpass before it propagates to other neural units. The machine learning model 202 may be self-learning or trained, rather than explicitly programmed, and may perform significantly better in certain areas of problem solving, as compared to computer programs that do not use machine learning. During training, an output 206 layer of the machine learning model 202 may correspond to a classification, and an input 204 known to correspond to that classification may be input into an input layer of machine learning model during training. During testing, an input without a known classification may be input into the input layer, and a determined classification may be output. For example, the classification may be an indication of whether an action is predicted to be completed by a corresponding deadline or not. The machine learning model 202 trained by a ML subsystem may include one or more latent space embedding layers at which information (e.g., various data discussed in connection with FIGS. 1-7) is converted into one or more vector representations in a latent embedding space. The one or more vector representations of the message may be pooled at one or more subsequent layers to convert the one or more vector representations into a single vector representation.

The machine learning model 202 may be structured as a factorization machine model. The machine learning model 202 may be a non-linear model and/or supervised learning model that can perform classification and/or regression. For example, the machine learning model 202 may be a general-purpose supervised learning algorithm that the system uses for both classification and regression tasks. In some embodiments, the machine learning model 202 may include a Bayesian model configured to perform variational inference, for example, to predict whether an action will be completed by the deadline. The machine learning model 202 may be implemented as a decision tree and/or as an ensemble model (e.g., using random forest, bagging, adaptive booster, gradient boost, XGBoost, etc.).

Figure 3:
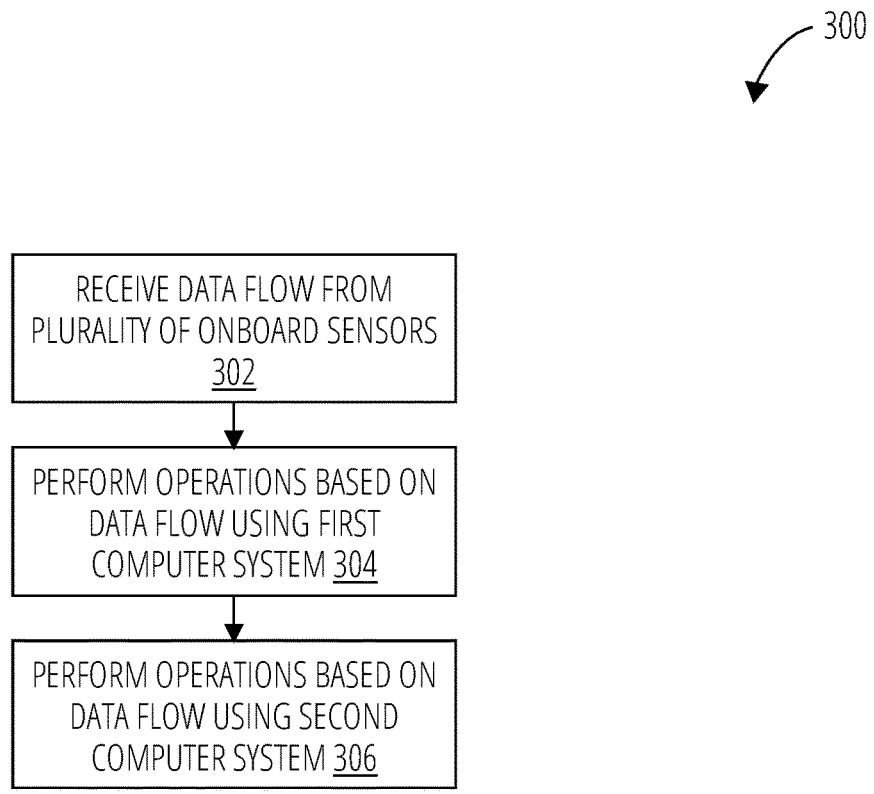
FIG. 3 illustrates an example flow diagram of a first method for parallel processing data flows in accordance with some embodiments.

FIG. 3 illustrates an example flow diagram illustrating a method 300 of parallel processing sensor data for robot operations and application development in accordance with some embodiments.

In some embodiments of the method 300, the robotic device receives (302) one or more data flows from a plurality of onboard sensors. The sensors may include one or more cameras, servos, actuators, pressure, temperature, inertial measuring units. In some embodiments, the robotic device receives data flows from onboard sensors of a distinct robotic device (e.g., robot 102) receives a dataflow of sensor data of robot 104. In some embodiments, the data flow is transmitted by establishing a networked connection (e.g., a Wi-Fi, Bluetooth, local area network (LAN) connection). In some embodiments, the robotic device 412 establishes a wireless or wired connection with a computer system (e.g., computing device 106).

In some embodiments of the method 300, the robotic device performs (304) one or more operations (e.g., computations) based on the data flow using a first computer system. In some embodiments, the first computer system is on-board the robot 102. The first computer system processes the data flow for operation of the robotic device. For example, the first computer system receives sensor data within the data flow indicating that the robot is straying off course. The computer system may calculate an actual difference of the current path trajectory with the intended path trajectory and control operation of the robot to align with the intended path.

The robotic device then may perform (306) operations based on data flow using the second computer system.

Figure 4:
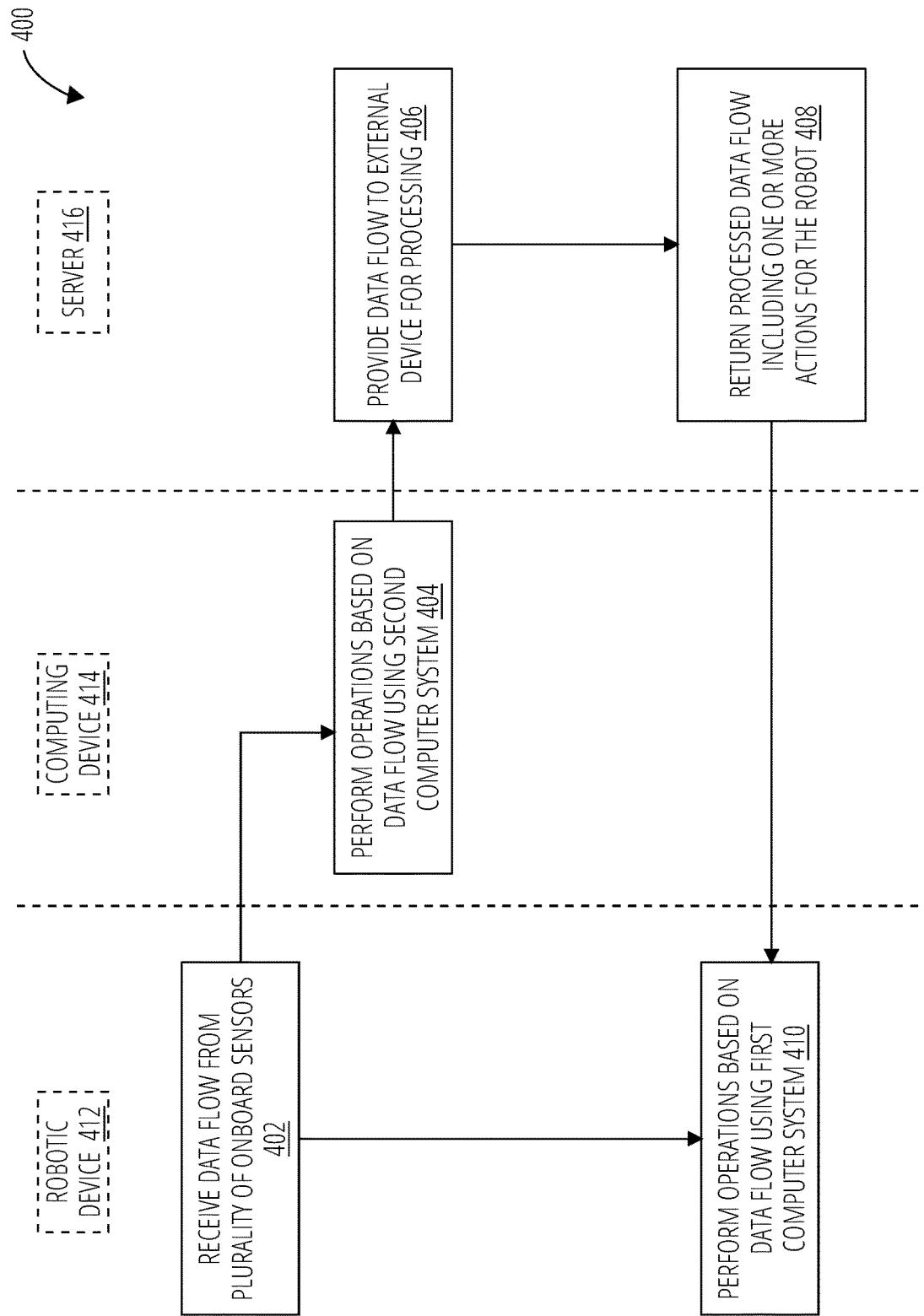
FIG. 4 illustrates an example flow diagram of a second method for presenting robotic data flows for application development in accordance with some embodiments.

FIG. 4 illustrates a lane diagram showing a method 400 of presenting selected robotic data flows as a platform for application development in accordance with some embodiments. The method 400 may be performed in part at a robotic device (e.g., robot 102) including one or more onboard sensors.

Method 400 may begin at a robotic device 412 when the robot receives (402) a data flow from a plurality of its onboard sensors. The robotic device performs (410) one or more operations based on the data flow using the first computer system (e.g., onboard computing system 114, FIG. 1).

In some embodiments, a second computing device, (e.g., computing device 414), performs (404) one or more operations based on the data flow. In some embodiments, the second computing device provides (406) the data flow to an external device for further processing. The external device may perform various analyses on the data flow including extracting, manipulating, transposing, filtering, and otherwise transforming the data for various applications. For example, the external device (e.g., server 112) receives a data flow from robot 102 including various sensor data obtained during the performance of one or more tasks by robot 102. The data flow may be used to develop new tasks for the robot to perform, update robot performance dashboards, develop robot configuration applications, and more. The second computing device may also submit the data flow to one or more established application developers through one or more application program interfaces (APIs). The data flow may also be published to be used by others.

In some embodiments, server 416 returns (408) to the robotic device, processed data from the data flow including one or more additional actions or tasks to be performed by the robotic device 412.

In some embodiments, robotic device 412 performs (410) operations based on data flow using the first computer system.

Figure 5:
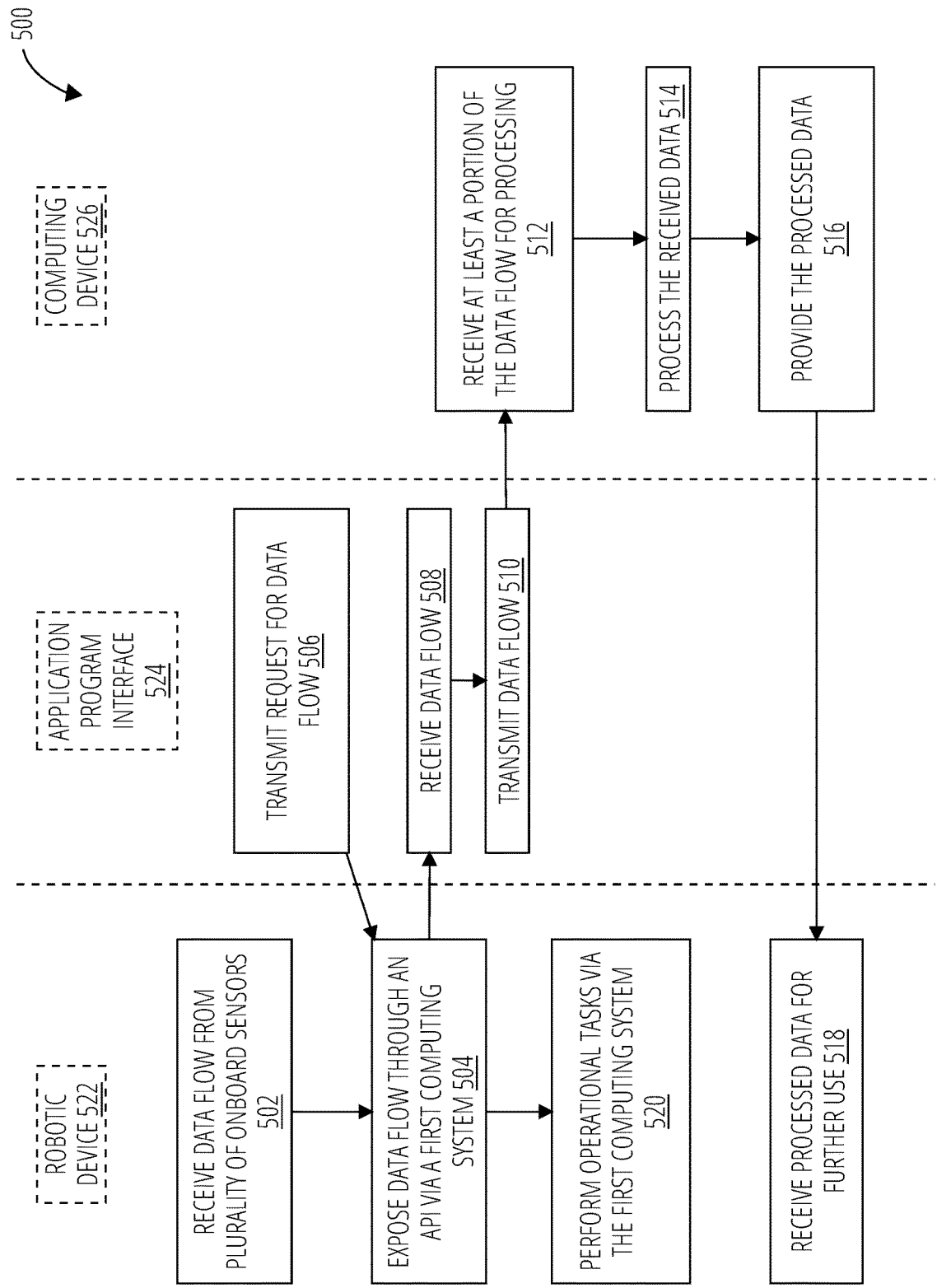
FIG. 5 illustrates an example flow diagram of a third method for presenting robotic data flows for application development in accordance with some embodiments.

FIG. 5 illustrates a lane diagram showing a method 500 of presenting selected robotic data flows as a platform for application development in accordance with some embodiments. The method 500 may be performed at least in part at robotic devices 522, application program interface 524, and computing device 526. In some embodiments of the method 500, the robotic devices 522 receives data flow from a plurality of onboard sensors. The robotic device 522 then may expose the data flow to an API via a first computing system (e.g., computing device 526).

The method 500 may begin at robotic device 522 receiving (502) a data flow from a plurality of onboard sensors.

In some embodiments, an API 524 transmits (506) to robotic device 522, a request for data flow. The API may submit regular requests to the robotic device for sensor data included in the data flow. The API may push such data, or respond to pull requests. In some embodiments, the API pushes events that cause event handlers to execute in the receiving process. In some embodiments, data consuming processes register a callback function with the API that is invoked responsive to data specified in associated with the callback function becoming available.

The robotic device may expose (504) the data flow for use by a third party through an application program interface using an onboard computing system.

In some embodiments, the application program interface 524 receives (508) the data flow from the robotic device. As described elsewhere herein, the computing device 526 may be a secondary computing device onboard the robot, a server, a local computing system, or a combination thereof.

The application program interface 524 may then transmit (510) the received data flow to a computing device (e.g., computing device 526) which receives (512) at least a portion of the data flow for processing. The computing devices 526 in some embodiments processes (514) the received data and provides (516) the processed data back to the robotic devices 522 in some embodiments.

The robotic device may receive (518) the processed data and perform further operations. For example, the computing device 526 transmits to robotic device 522, updated instructions on performance of a task. The updated instructions may include improvements to performance of a pervious task that the robotic device had performed. Based on the received data, the robotic device may perform (520) the task or store the instructions including improvements for performance of the task at a future time.

Figure 6:
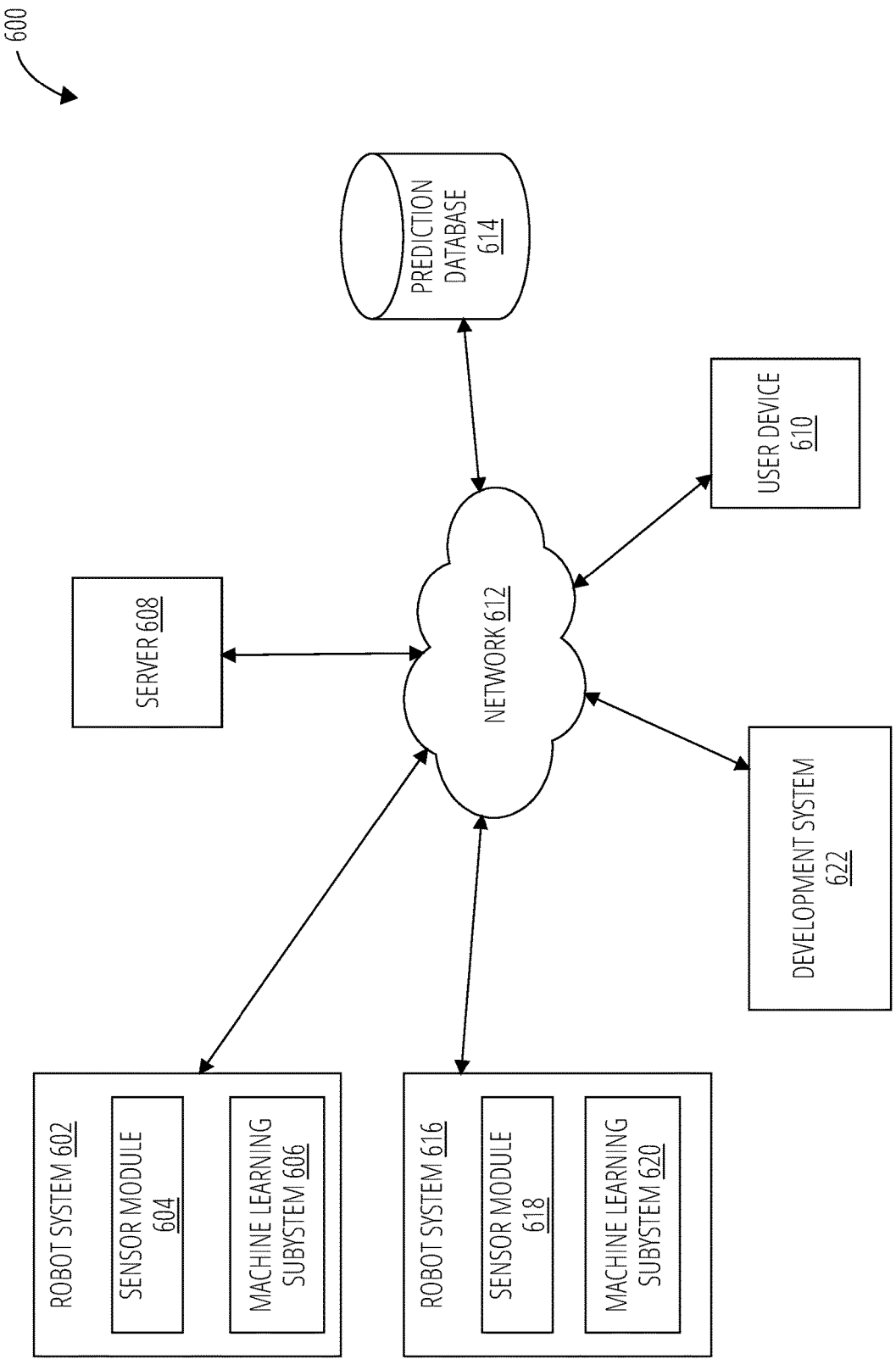
FIG. 6 illustrates an example robotics system that may be used in accordance with some embodiments.

FIG. 6 illustrates a block diagram of a representative system 600 including one or more robot system 602 in accordance with some embodiments.

The computing system 600 may include a robot system 602, robot system 616, robot development system 622, a server 608, a user device 610, and actuation database 616. The robot system (e.g., robot system 602) may include a sensor module 604, a machine learning subsystem 606. Similarly, robot system 616 includes sensor module 618 that may include the same sensors as found in robot system 602, or different sensors, a same number of sensors, or a different number of sensors. Robot system 616 also includes machine learning subsystem 620. In some embodiments, robot system 602 is analogous to robot 102 described with respect to FIG. 1. It is understood that each robot or robot system can include various configurations of modules and additional modules not shown in the figures but are contemplated as part of the invention described herein.

Robot system 602 is an example of a robot that includes a sensor module 604, a machine learning subsystem 606, and a communication 626 module. Additional modules may be included but are not illustrated in FIG. 6. Robot system 602 may be modularly configurable, meaning, one or more modules may be added or removed from the Robot system 602. Robot system 616 may be substantially the same robot as robot system 602.

Sensor module 604 of robot system 602 may include a plurality of sensors including temperature sensors, pressure sensors, cameras, inertial measurement units (IMUs), and other various configurable sensors. Each of the sensors may be configured to provide sensor data to an onboard computer system or transmitted via network 612 to one or more computing devices including server 608 and/or user device 610.

The machine learning subsystem 606 may include a plurality of machine learning models. For example, the machine learning subsystem 606 may pipeline an encoder and a reinforcement learning model that are collectively trained with end-to-end learning, the encoder being operative to transform relatively high-dimensional outputs of a robot's sensor suite into lower-dimensional vector representations of each time slice in a latent embedding space, and the reinforcement learning model being configured to update setpoints for robot actuators based on those vectors. Some embodiments of the machine learning subsystem 606 may include an encoder model, a dynamic model, an actor-critic model, a reward model, an anomaly detection model, or a variety of other machine learning models (e.g., any model described in connection with FIG. 2. One or more portions of the machine learning subsystem 606 may be implemented on the robot system 602, the server 608, or the development system 622. Although shown as distinct objects in FIG. 6, functionality described below in connection with the robot system 602, the server 608, or the development system 622 may be performed by any one of the robot systems 602, the server 608, or the development system 622. The robot system 602, the server 608, or the development system 622 may communicate with each other via the network 612.

The communication module 626 may be used by the robot system 602 to communicate with another robot system (e.g., Robot system 616), server 608, development system 622, user device 610, actuation database 616, or any other networked peripheral device.

The development system 622 may be in communication with robot systems, user devices, prediction databases, and servers as a platform for application development. Applications are understood to mean any type of robotic interface, robotic tasks, dashboard displays, or any other application aided by utilizing sensor data collected from the robots in the robot system.

Actuation database 616 may include a directory of possible tasks that the fleet of robots are able to handle. For example, actuation database 616 includes a list of various categories of tasks that a set robot is able to perform. Robot A may be able to pick up, carry, and deposit objects weighing up to 25 pounds, whereas Robot B may only be able to pick up, carry, and deposit objects weighing up to 5 pounds. The actuation database may include data pertaining to robot capabilities as well as historical information on performance of tasks (e.g., wear-state vectors for each actuator of each robot). Additional information may be stored at the actuation database including optimization algorithms, one or more machine learning models, training data, historical data, metadata, performance data, and cost-schedules.

The robot system 602 may obtain records generated from one or more user devices 610. User device 610 may be used as input devices from human operators instructing the robot to perform one or more tasks. For example, user A of user device 610 submits a request for performance of a set of tasks. The request may be routed through network 612, to actuation database 616, server 608, development system 622, and/or robot system 602 or robot system 616 for performance of the set of tasks.

The robot system 602 may include one or more cameras that may be used to record the environment surrounding the robot system 602. The cameras may include one or more RGB cameras (e.g., with a complementary metal oxide semiconductor), one or more infrared cameras, one or more depth sensing cameras or a variety of other cameras. In some cases, the cameras are arranged in stereoscopic arrays, and some embodiments use structured light, time-of-flight, or LIDAR to sense depth. The development system 622 may output video or images obtained via cameras of the robot system 602 to a display 626 of the robot. The display 626 may include a virtual reality headset, an augmented reality display (e.g., augmented reality glasses), a screen, or a variety of other displays.

In some embodiments, robots implementing the present techniques may be trained and controlled with models like those described in a U.S. patent application titled SPATIO-TEMPORAL CONSISTENCY EMBEDDINGS FROM MULTIPLE OBSERVED MODALITIES, assigned application Ser. No. 17/657,723, now U.S. Pat. No. 11,636,398.

In some embodiments, robots implementing the present techniques may be trained and controlled with models like those described in a U.S. patent application titled HYBRID COMPUTING ARCHITECTURES WITH SPECIALIZED PROCESSORS TO ENCODE/DECODE LATENT REPRESENTATIONS FOR CONTROLLING DYNAMIC MECHANICAL SYSTEMS, assigned application Ser. No. 17/711,960, now U.S. Pat. No. 11,478,927.

In some embodiments, robots implementing the present techniques may have touch sensors like those described in a U.S. patent application titled COMBINED ANALOG AND DIGITAL ARCHITECTURE FOR HANDLING SENSORY INPUT DATA, assigned application Ser. No. 17/711,983, now U.S. Pat. No. 11,625,122.

In some embodiments, fleets of robots implementing the present techniques may be managed with systems like those described in a U.S. patent application titled CONFIGURING AND MANAGING FLEETS OF DYNAMIC MECHANICAL SYSTEMS, assigned application Ser. No. 17/711,991.

In some embodiments, fleets of robots implementing the present techniques may managed with systems like those described in a U.S. patent application titled SCHEDULER FOR ROBOT FLEETS, assigned application Ser. No. 17/711,997, now U.S. Pat. No. 12,099,343.

Figure 7:
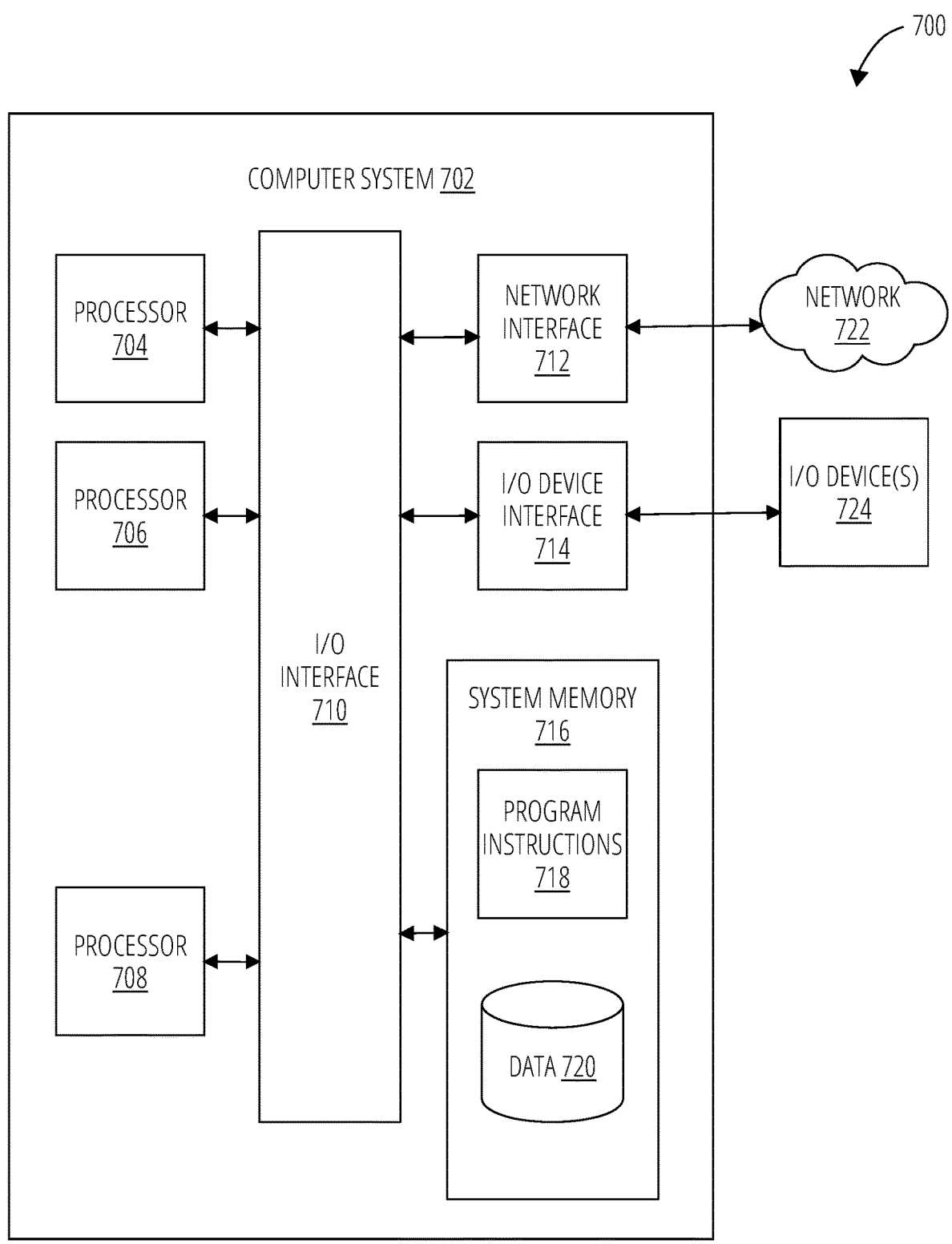
FIG. 7 illustrates an example computer system in accordance with some embodiments.

FIG. 7 illustrates an example system 700 depicting an example computing system 702 by which the above techniques may be implemented. Various portions of systems and methods described herein, may include, or be executed on one or more computer systems similar to computing system 700. Further, processes and modules described herein may be executed by one or more processing systems similar to that of computing system 700.

Computer system 702 may include one or more processors (e.g., processors 704-708) coupled to 716, an input/output 714, and a network interface 712 via an input/output (I/O) 710. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 702. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 716). Computer system 702 may be a units-processor system including one processor (e.g., processor 704), or a multiprocessor system including any number of suitable processors (e.g., 504-508). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computer system 702 may include a plurality of computing devices (e.g., distributed computer systems) to implement various processing functions.

I/O device interface 714 may provide an interface for connection of one or more I/O devices 724 to computer system 702. I/O devices may include devices that receive input (e.g., from a user) or output information (e.g., to a user). I/O devices 724 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 760 may be connected to computer system 702 through a wired or wireless connection. I/O devices 724 may be connected to computer system 702 from a remote location. I/O device(s) 724 located on remote computer system, for example, may be connected to computer system 702 via a network 722 and network interface 712.

Network interface 712 may include a network adapter that provides for connection of Computer System 702 to a network 722. Network interface 712 may facilitate data exchange between Computer System 702 and other devices connected to the network. Network interface 712 may support wired or wireless communication. The network may include an electronic communication network, such as the Internet, a local area network (LAN), a wide area network (WAN), a cellular communications network, or the like.

System memory 716 may be configured to store program instructions 718 or data 720. Program Instructions 718 may be executable by a processor (e.g., one or more of processors 704-708) to implement one or more embodiments of the present techniques. Instructions 718 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 716 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 716 may include a non-transitory computer readable storage medium that may have program instructions stored thereon that are executable by a computer processor (e.g., one or more of processors 704-708) to cause the subject matter and the functional operations described herein. A memory (e.g., system memory 716) may include a single memory device and/or a plurality of memory devices (e.g., distributed memory devices).

I/O interface 710 may be configured to coordinate I/O traffic between processors 704-708, system memory 716, network interface 712, I/O devices 724, and/or other peripheral devices. I/O interface 710 may perform protocol, timing, or other data transformations to convert data signals from one component (e.g., system memory 716) into a format suitable for use by another component (e.g., processors 704-708). I/O Interface 710 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 702 or multiple computing systems 700 configured to host different portions or instances of embodiments. Multiple computing systems 700 may provide for parallel or sequential processing/execution of one or more portions of the techniques described herein.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description is not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square," "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish, or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A system, comprising: a robot having a first computing system configured to control operation of the robot based on data flows received from a plurality of sensors of the robot, the first computing system being onboard the robot and having a first network interface, the first computing system exposing an application program interface (API) by which at least some of the data flows are consumable by other computing devices; and a second computing system having a second network interface and configured to both receive, via the API and the second network interface, and process at least some of the data flows concurrently while the first computing system controls operation of the robot.

2. The system of embodiment 1, wherein the second computing system is configured to provide a dashboard representative of sensor data from the data flow.

3. The system of embodiment 1, wherein the robot is a first robot, and the second computing system is configured to process and transmit data flows to one or more robots in a fleet including the first robot.

4. The system of embodiment 1, wherein the second computing system is configured to receive an inbound connection to remotely control the robot.

5. The system of embodiment 1, wherein the second computing system is configured to provide offline processing of the data flow while the first computing system is inactive or processing other data.

6. The system of embodiment 1, wherein the second computing system is configured to determine whether a time slice of the data flows satisfy a defensive sampling criteria and, in response to determining that the time slice of the data flows do not satisfy the defensive sampling criteria determining to not advance to another process or to discard the time slice.

7. The system of embodiment 1, wherein the second computing system is configured to provide at least some of the data flows to a process configured to perform a computer vision task corresponding to a mechanical task being performed by the robot.

8. The system of embodiment 1, wherein the computer vision task is scanning an optical code on a workpiece being manipulated by the robot in the mechanical task.

9. The system of embodiment 1, wherein the second computing system is configured to provide at least some of the data flows to a process configured to perform a statistical process control task corresponding to a mechanical task being performed by the robot.

10. The system of embodiment 1, wherein the second computing system is configured to provide at least some of the data flows to a process configured to perform a manufacturing traceability task corresponding to a mechanical task being performed by the robot.

11. The system of embodiment 1, wherein the second computing system is configured to provide at least some of the data flows to a process configured to perform a manufacturing traceability task corresponding to a mechanical task being performed by the robot.

12. The system of embodiment 1, wherein the second computing system is configured to provide, based on the data flows, image data by which an augmented reality display is rendered operative to guide a user manually operating the robot.

13. The system of embodiment 12, wherein the augmented reality display is configured to display at least one of the following: singularity points of the robot to be avoided for path planning, optimal paths from a current state to an expected target state of the robot, predicted next movements based on a current state of the robot of a partially or fully trained model by which the robot is controlled, or instructions corresponding to a next step in a process being performed by the robot.

14. The system of embodiment 12, wherein the augmented reality display is configured to display each of the following: singularity points of the robot to be avoided for path planning, optimal paths from a current state to an expected target state of the robot, predicted next movements based on a current state of the robot of a partially or fully trained model by which the robot is controlled, and instructions corresponding to a next step in a process being performed by the robot.

15. The system of embodiment 1, wherein the second computing system comprises a cluster of computing devices configured to collectively execute a distributed real-time, complex event processing framework that processes the data flows.

16. The system of embodiment 1, wherein the second computing system is configured to: provide at least some of the data flows to a process configured to detect model suitability to a mechanical task being performed by the robot, provide at least some of the data flows to a process configured to detect model suitability of a model by which the robot is controlled, provide at least some of the data flows to a process configured to compare planned versus executed paths of the robot, or provide at least some of the data flows to a process configured to detect noise in movements of the robot.

17. The system of embodiment 16, wherein the second computing system is configured to: provide at least some of the data flows to a first process configured to detect model suitability to a mechanical task being performed by the robot, provide at least some of the data flows to a second process configured to detect model suitability of a model by which the robot is controlled, provide at least some of the data flows to a third process configured to compare planned versus executed paths of the robot, and provide at least some of the data flows to a fourth process configured to detect noise in movements of the robot.

18. The system of any one or any subset of embodiments 1-17, wherein: the plurality of sensors of the robot includes one or more of cameras, servos, and tactile sensors; and the second computing system provides, via the API and the second network interface, data flows received from the plurality of sensors of the robot to a reinforcement learning policy, wherein the reinforcement learning policy generates instructions for performance of one or more actions by the robot.

What is claimed is:
1. A system, comprising:
a robot having a first computing system configured to control operation of the robot based on data flows received from a plurality of sensors of the robot, the plurality of sensors of the robot including a camera, a servo, and a tactile sensor, the first computing system being onboard the robot and having a first network interface, the first computing system exposing an application program interface (API) by which at least some of the data flows are consumable by other computing devices; and a second computing system having a second network interface and configured to both receive, via the API and the second network interface, at least some of the data flows and process the at least some of the data flows concurrently while the first computing system controls operation of the robot, wherein the second computing system:

applies labels to at least some of the data flows; and provides labeled data flows to a reinforcement learning policy, wherein the reinforcement learning policy generates, based on the labeled data flows, instructions for performance of one or more actions by the robot;

and wherein the first computing system onboard the robot receives the instructions for the performance of one or more actions by the robot and executes the instructions to cause the robot to perform one or more actions.

2. The system of claim 1, wherein the second computing system is configured to provide a dashboard representative of sensor data from the data flow.

3. The system of claim 1, wherein the robot is a first robot, and the second computing system is configured to process and transmit data flows to one or more robots in a fleet including the first robot.

4. The system of claim 1, wherein the second computing system is configured to receive an inbound connection to remotely control the robot.

5. The system of claim 1, wherein the second computing system is configured to provide offline processing of the data flow while the first computing system is inactive or processing other data.

6. The system of claim 1, wherein the second computing system is configured to determine whether a time slice of the data flows satisfy a defensive sampling criteria and, in response to determining that the time slice of the data flows do not satisfy the defensive sampling criteria determining to not advance to another process or to discard the time slice.

7. The system of claim 1, wherein the second computing system is configured to provide at least some of the data flows to a process configured to perform a computer vision task corresponding to a mechanical task being performed by the robot.

8. The system of claim 7, wherein the computer vision task is scanning an optical code on a workpiece being manipulated by the robot in the mechanical task.

9. The system of claim 1, wherein the second computing system is configured to provide at least some of the data flows to a process configured to perform a statistical process control task corresponding to a mechanical task being performed by the robot.

10. The system of claim 1, wherein the second computing system is configured to provide at least some of the data flows to a process configured to perform a manufacturing traceability task corresponding to a mechanical task being performed by the robot.

11. The system of claim 1, wherein the second computing system is configured to provide, based on the data flows, image data by which an augmented reality display is rendered operative to guide a user manually operating the robot.

12. The system of claim 11, wherein the augmented reality display is configured to display at least one of the following:
singularity points of the robot to be avoided for path planning,
optimal paths from a current state to an expected target state of the robot,
predicted next movements based on a current state of the robot of a partially or fully trained model by which the robot is controlled, or
instructions corresponding to a next step in a process being performed by the robot.

13. The system of claim 11, wherein the augmented reality display is configured to display each of the following:
singularity points of the robot to be avoided for path planning,
optimal paths from a current state to an expected target state of the robot,
predicted next movements based on a current state of the robot of a partially or fully trained model by which the robot is controlled, and
instructions corresponding to a next step in a process being performed by the robot.

14. The system of claim 1, wherein the second computing system comprises a cluster of computing devices configured to collectively execute a distributed real-time, complex event processing framework that processes the data flows.

15. The system of claim 1, wherein the second computing system is configured to:
provide at least some of the data flows to a process configured to detect model suitability to a mechanical task being performed by the robot,
provide at least some of the data flows to a process configured to detect model suitability of a model by which the robot is controlled,
provide at least some of the data flows to a process configured to compare planned versus executed paths of the robot, or
provide at least some of the data flows to a process configured to detect noise in movements of the robot.

16. The system of claim 15, wherein the second computing system is configured to:
provide at least some of the data flows to a first process configured to detect model suitability to a mechanical task being performed by the robot,
provide at least some of the data flows to a second process configured to detect model suitability of a model by which the robot is controlled,
provide at least some of the data flows to a third process configured to compare planned versus executed paths of the robot, and
provide at least some of the data flows to a fourth process configured to detect noise in movements of the robot.

17. The system of claim 1, wherein the second computing system is configured to perform means for providing an auxiliary application.

18. A method, comprising:
controlling a robot with a first computing system configured to control operation of the robot based on data flows received from a plurality of sensors of the robot, the plurality of sensors of the robot including a camera, a servo, and a tactile sensor, the first computing system being onboard the robot and having a first network interface, the first computing system exposing an application program interface (API) by which at least some of the data flows are consumable by other computing devices;

receiving, by a second computing system having a second network interface, via the API and the second network interface, at least some of the data flows and processing, by the second computing system, the at least some of the data flows concurrently while the first computing system controls operation of the robot;

applying, by the second computing system, labels to at least some of the data flows;

providing, by the second computing system, labeled data flows to a reinforcement learning policy, wherein the reinforcement learning policy generates, based on the labeled data flows, instructions for performance of one or more actions by the robot;

receiving, by the first computing system, the instructions for the performance of one or more actions by the robot; and executing, by the first computing system, the instructions to cause the robot to perform one or more actions.

19. The system of claim 1 wherein the data flows received from the plurality of sensors of the robot include data flows received from the plurality of sensors of the robot while the robot performs a task, and wherein the instructions for the performance of one or more actions by the robot includes instructions for improving the performance of the task by the robot.

20. The method of claim 18 wherein:

controlling the robot with the first computing system based on data flows received from the plurality of sensors of the robot includes controlling the robot to perform a task;

the reinforcement learning policy generates, based on the labeled data flows, instructions for improving the performance of the task by the robot; and executing, by the first computing system, the instructions to cause the robot to perform one or more actions includes executing, by the first computing system, the instructions to cause the robot to perform the task with improved performance.

* * * * *